United States Patent [19]

Nakamura et al.

[11] Patent Number: 4,997,075
[45] Date of Patent: Mar. 5, 1991

[54] CLUTCH RELEASING BEARING APPARATUS

[75] Inventors: Takeshi Nakamura, Samukawa; Takeo Ohkuma, Fujisawa, both of Japan

[73] Assignees: Mazda Motor Corporation, Hiroshima; Nippon Seiko Kabushiki Kaisha, Tokyo, both of Japan

[21] Appl. No.: 210,729

[22] Filed: Jun. 22, 1988

[51] Int. Cl.⁵ .............................................. F16D 23/14
[52] U.S. Cl. ................................. 192/98; 192/89 B; 192/99 S; 192/110 B
[58] Field of Search .................... 192/98, 110 B, 89 B, 192/99 S

[56] References Cited

U.S. PATENT DOCUMENTS

| | | | |
|---|---|---|---|
| 3,800,928 | 4/1974 | Pray | 192/110 B |
| 4,428,472 | 1/1984 | Olschewski et al. | 192/98 |
| 4,519,488 | 5/1985 | Renaud | 192/98 |
| 4,570,773 | 2/1986 | Ernst et al. | 192/98 |
| 4,608,741 | 9/1986 | Mallet | 192/98 |

FOREIGN PATENT DOCUMENTS

| | | | |
|---|---|---|---|
| 62-242132 | 10/1987 | Japan . | |
| 1495775 | 12/1977 | United Kingdom . | |
| 2052001 | 1/1981 | United Kingdom | 192/98 |
| 2054084 | 2/1981 | United Kingdom | 192/98 |

Primary Examiner—Kenneth J. Dorner
Assistant Examiner—Brian K. Green
Attorney, Agent, or Firm—Shapiro and Shapiro

[57] ABSTRACT

A clutch release bearing apparatus comprises a clutch release bearing and a holding mechanism therefor. At a location of the holding mechanism where a driving member applies a driving force for clutch releasing, a shift member shiftable in a direction perpendicular to an axis of the bearing is disposed.

10 Claims, 2 Drawing Sheets

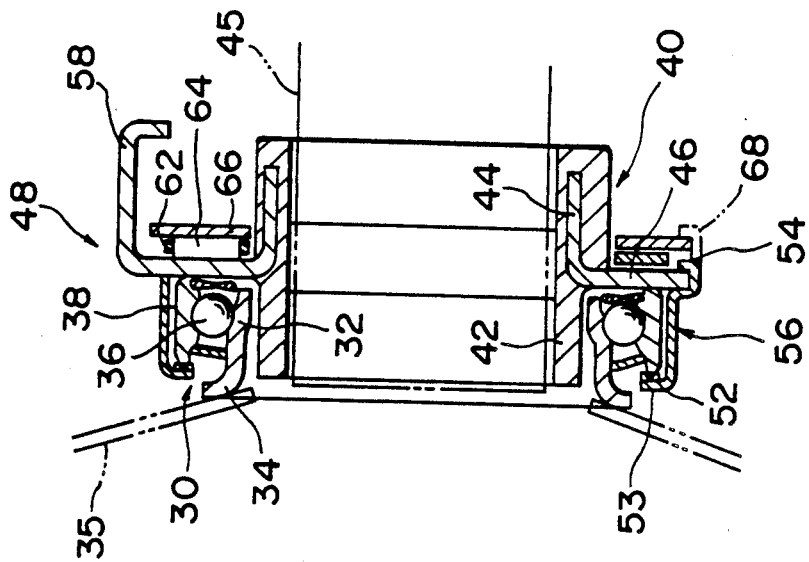

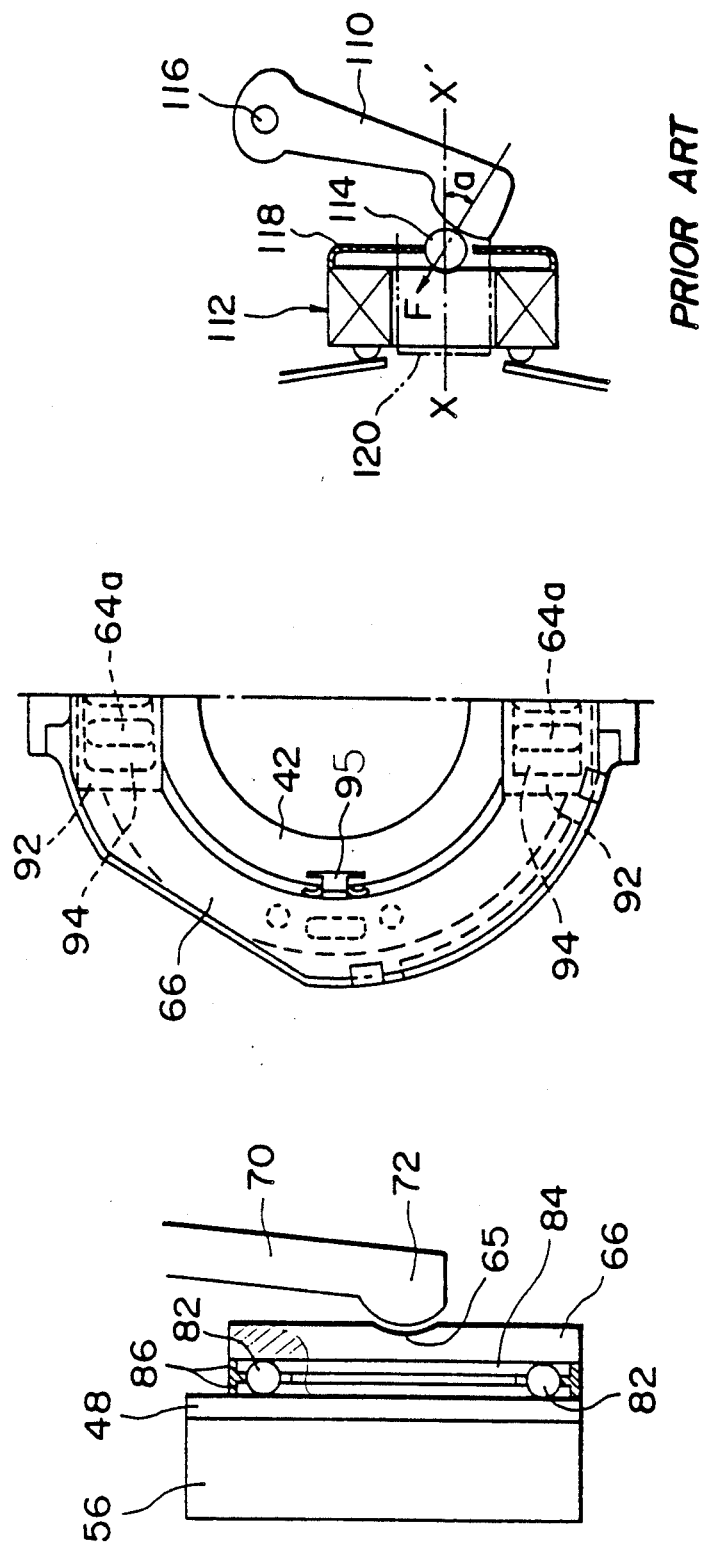

CLUTCH RELEASING BEARING APPARATUS

BACKGROUND OF THE INVENTION

1. Field of the Invention

The present invention relates to an improvement of a clutch releasing bearing apparatus for vehicles, and more specifically, it relates to a clutch releasing bearing apparatus in which a portion of the apparatus against which an operating fork is abutted can be prevented from wearing due to contact or abutment therebetween.

2. Related Background Art

As is known, a clutch releasing bearing apparatus is axially shiftable and is arranged between a diaphragm of a clutch device and an operating fork operatively connected to a clutch pedal, and in such a manner that it is axially shifted by an operating force from the operating fork to transmit the operating force to the diaphragm, thereby releasing the clutch. In this arrangement, the operating fork contacts with or abuts against a portion of the clutch releasing bearing apparatus, and the transmission of the operating force to the diaphragm is normally effected by applying a mechanical force to the bearing apparatus from the operating fork through the contacted portions therebetween. However, in this case, the contacting portion of the bearing apparatus against which the operating fork is abutted is subjected to wear due to repeated clutch operations, thus increasing the "step-into" force or stroke of the clutch and/or impairing the release of the clutch.

According to one technique proposed to solve this problem, and as shown in FIG. 5, a rolling member 114 is interposed between the fork 110 and the bearing apparatus 112 to reduce the wear of the contacting portion of the bearing apparatus by rotation of the rolling member itself. This technique has been adopted, for example, as described in the U. K. Patent No. 1,495,775.

However, this conventional clutch releasing bearing apparatus has the following disadvantages. That is to say, since the fork 110 is rotated around a pin 116 on which the fork 110 is rotatably pivoted, the rolling member 114 is subjected to a force F from the fork 110 in a direction inclined by an angle $\alpha$ with respect to a central axis X—X' of the bearing apparatus (the direction of F being indicated by an arrow in FIG. 5). As a result, the rolling member 114 is radially lifted by the force F, thus applying a moment to the whole bearing apparatus via a holder 118 for holding the rolling member. Consequently, there arises a disadvantage that sliding resistance in sliding portions between the bearing apparatus 112 and a guide shaft 120 for guiding the bearing is increased, and, particularly in case of an aluminum guide shaft, jamming and/or abnormal abrasion will occur in the sliding portions due to deflection of those portions generated by the above-mentioned moment. Further, there is a problem that the repeated operation of the fork will cause wear of an inner guide surface for guiding the rolling member of the holder 118 and/or fatigue damage of a fixed portion of the holder stationary with respect to the bearing.

Another conventional clutch releasing bearing apparatus is taught by the Japanese Patent Laid-Open No. 62 - 242132. In this conventional apparatus, a bearing holding member (anvil) is provided at a surface thereof with a pair of diametrically opposed bearing receiving portions into which slide bearings each comprising a needle roller and a holder therefore are received, respectively. Each of the abutment plates comprises a rectangular plate incorporated into each of the slide bearings.

However, with this arrangement, this conventional apparatus has a disadvantage that the apparatus requires a large number of parts, is expensive, and is difficult to assemble. Further, there is a problem that, in use, the slide bearings and the abutment plates are easily inclined, thus preventing the rotation of the rolling members, and, thereby, considerably reducing any advantage obtained by the utilization of the rolling members.

SUMMARY OF THE INVENTION

In consideration of the above situation, it is an object of the present invention to provide a clutch releasing bearing apparatus which can eliminate all of the disadvantages of the conventional clutch releasing bearing apparatus utilizing a rolling member or rolling members in the contact portion against which the operating fork is abutted. Thus, the present invention provides a clutch releasing bearing apparatus which, while it utilizes a rolling member in the contact portion, is not subjected to a moment due to the operating force generated by the operating fork.

It is another object of the present invention to provide a clutch releasing bearing apparatus which does not require a large number of parts, and which is cheap and easy to assemble.

In order to achieve the above objects, according to the present invention, a shifting member is arranged on a portion (for example, an anvil) of a bearing holding member against which the driving portion of a driving member direction of the bearing, it is mainly (such as a fork member and the like) is abutted.

The shifting member abuts against the driving portion and can be shifted by and in the direction of a component of force parallel to a surface of the shifting member and perpendicular to an axis of the bearing. Accordingly, the force component in a direction parallel to the surface of the shifting member is essentially not transmitted through the shifting member, and it is mainly the force component in a direction perpendicular to the surface of the shifting member (i.e., in an axial direction of the bearing) that is transmitted through the shifting member, whereby the clutch releasing bearing is axially shifted to release the clutch.

According to the present invention, as stated above, since the driving member is abutted against the shifting member, which is arranged on the bearing holding member to shift in a plane perpendicular to the axial direction of the bearing, it is mainly the force directed perpendicular to the plane of the shifting member (i.e., in a direction parallel to an axis of the bearing holding member) that is transmitted through the shifting member from the driving member. In other words, force in a direction oblique with respect to the plane of the shifting member is scarcely transmitted through the shifting member.

Accordingly, even when the driving member abuts against the bearing holding member, the bearing holding member, and consequently the whole bearing apparatus, is not subjected to rubbing action, wherefore the clutch releasing bearing apparatus can perform proper releasing operation stably for a long term. Further, as will be explained more fully hereinafter when a rolling member is interposed between the shifting member and the bearing holding member and a lubricant maintaining means is provided in the rolling part, the shifting member can be shifted more smoothly, thus preventing jamming of the bearing apparatus more effectively.

BRIEF DESCRIPTION OF THE DRAWINGS

FIG.. 1 is a side view of a clutch releasing bearing apparatus according to a preferred embodiment of the present invention;

FIG. 2 is a sectional view taken along the line II—II of FIG. 1;

FIG. 3 is a diagrammatic elevational view partly in section, of main parts of the clutch releasing bearing apparatus according to a second embodiment of the present invention;

FIG. 4 is a side view showing only a left half of the clutch releasing bearing apparatus according to a third embodiment of the present invention; and FIG. 5 is an elevational view of main parts of a conventional clutch releasing bearing apparatus.

DESCRIPTION OF THE PREFERRED EMBODIMENTS

The present invention will now be explained with reference to the illustrated embodiments. It should be noted that the present invention is not limited to these illustrated embodiments.

Firstly, a preferred embodiment of the present invention will be explained in connection with FIGS. 1 and 2.

In FIGS. 1 and 2, a clutch releasing bearing apparatus comprises a clutch releasing bearing 30 and a holding means 40 for holding the bearing 30. The clutch releasing bearing 30 includes an inner race 32 having at one end thereof an abutment portion 34 which is engaged by a diaphragm spring 35 of a clutch device (not shown), an outer race 38 arranged coaxially with respect to the inner race 32, and a plurality of balls 36 interposed between these races, the inner race 32 being rotatable relative to the outer race 38.

The holding means 40 includes a cylindrical sleeve 42 of synthetic resin material fitted on a guide shaft 45 of a transmission device (not shown), an annular anvil 48 of metal or synthetic resin material having a radial flange 46 and an inner cylindrical portion 44 which is contiguous to the flange 46 and is embedded into the sleeve 42, and a generally cylindrical case 56 having one end 53 engaged by an end surface of the outer race 38 via a spring member 52 and another end 54 engaged by an outer circumferential edge of the flange 46 of the anvil 48. The anvil 48 has a pair of diametrically opposed extensions 58.

The holding means 40 further includes a desired number of rollers 64 retained on a face of the flange 46 of the anvil 48 by means of an annular disc-shaped holder 62, and a hollow or annular guide plate 66 which acts as a shifting member and is shiftable relative to the anvil 48 through the medium of the rollers. As apparent from FIG. 1, the rollers are arranged in two sets of three rollers 64a diametrically opposed (six in total) and a pair of rollers 64b diametrically opposed in a direction perpendicular to the diametrical direction regarding the rollers 64a. A desired number of detent pawls 68 formed on the case 56 are engaged by the guide plate 66.

The sleeve 42 is generally cylindrical, but has a pair of flat portions 71 thereon, which are diametrically opposed and parallel to each other. In correspondence to the contour of the sleeve, each of the central openings of the holder 62 and the guide plate 66 is defined by a pair of diametrically opposed circular arc portions and a pair of straight portions contiguous to the arc portions. An inner diameter of each of the central openings of the members 62, 66 defined by the above-mentioned circular arc portions is slightly larger than an outer diameter of the sleeve 42 to leave small clearance or gap δ therebetween.

As shown by a two-dotted line in FIG. 1, a fork member 70 acting as a driving member has a lateral U-shaped configuration and is rotatable or rockable around an axis A—A. The fork member has a pair of abutment portions 72 acting as driving portions which can be abutted against the back of the rollers 64a on the guide plate 66 by the rotation of the fork member 70.

Next, operation of the embodiment described above will be explained.

When the fork member 70 is rotated around the axis A—A by depressing a clutch pedal (not shown), each of the abutment portions 72 of the fork member urges or abuts against the guide plate 66. Consequently, as described in connection with FIG. 5, a force component directed from right to left in FIG. 1 is applied to the guide plate 66; however, the bearing apparatus is not jammed by such application of force, since the guide plate can be shifted in a direction to which the above force component is applied. More particularly, among the components of force applied to the guide plate 66 from the fork member 70, the component of force directed in the plane of the guide plate 66 is absorbed or compensated by the movement of the guide plate 66, and only a component of force perpendicular to the plane of the guide plate 66 (i.e., from right to left in FIG. 2) is transmitted from the guide plate 66 to the flange 46 of the anvil 48 through the rollers 64. The amount of movement of the guide plate 66 is limited within the dimension of the gap δ.

When the anvil is subjected to the transmitted axial force, the bearing 30 is shifted from right to left in FIG. 2 (i.e., in its axial direction), with the result that the end 34 of the inner race 32 of the bearing urges the diaphragm spring 35, thus releasing the clutch (not shown). If the bearing is eccentric with respect to the clutch, the bearing can be shifted radially due to a centrifugal force to align a central axis of the bearing with that of the clutch.

Next, other embodiments of the present invention will now be explained with reference to FIGS. 3 and 4.

In the embodiment shown (diagrammatically) in FIG. 3, the outer circumferential surface of an annular holder plate 84 for holding balls 82, is provided with ribs 86 projecting in opposite axial directions of the holder 84, one of the ribs engaging with the anvil 48 and one with the guide plate 66. It is desirable to supply lubricant such as grease between the balls 82 and associated portions of the plate 84 contacting therewith to assure smooth rotating the balls. In this case, there is a problem if the lubricant flows outside during continuous operation of the bearing apparatus. However, in the embodiment of FIG. 3, such problem can be effectively solved. More particularly, a labyrinth seal is formed by the ribs 86, whereby the leakage of the lubricant can be prevented effectively, thus maintaining the smooth movement of the guide plate 66 for a long term. The abutment portion 72 of the fork member 70 can be engaged by a recess 65 formed in guide plate 66. The ribs 86 can also effectively prevent dust, water and the like from entering into the bearing apparatus.

FIG. 4 shows the left half of another embodiment of the subject clutch releasing bearing apparatus (the right half of the apparatus is not shown since it is of the same construction as the illustrated left half). In this embodiment, in order to maintain the grease in the sliding portions between the rollers 64a and the guide plate 66, the height of portions 92 of the guide plate 66 corresponding to the rollers 64a is increased to form or define recesses 94 for maintaining the grease in the portions 92. Further, a pair of spring members 95 (only one of which is shown) is arranged between the sleeve 42, the guide plate 66 and a holder (not shown) in such a manner that the spring members 95 provide opposed spring forces in right-and-left directions (horizontal directions) in FIG. 4. Therefore, even when the fork member 70 is separated away from the guide plate 66, the radial position of the bearing apparatus relative to the sleeve 42 is stabilized, thus maintaining the axial smooth movement of the guide plate.

Finally, in the embodiments mentioned above, various modifications and alterations may be adopted. For example, changes in the kind and/or number of the rolling members, the configuration of the guide plate, the type of the clutch releasing bearing (for example, non self-aligning type) and the like may be suitably adopted. Further, in case of an anvil 48 of metal material, the anvil may be coated by a suitable material to prevent generation of rust on the anvil and wear of the anvil. On the other hand, in case of an anvil of synthetic resin material, the anvil may be formed integrally with the sleeve 42.

What is claimed is:

1. Clutch releasing bearing apparatus for vehicles, comprising a clutch releasing bearing including an engaging portion engaged by a diaphragm spring of a clutch device, and holding means holding said clutch releasing bearing and axially shiftably received on a guide shaft of a transmission device, said holding means being axially shiftable by driving portions of a pivotable driving member for urging said engaging portion of said clutch releasing bearing against said diaphragm spring, characterized in that:
an annular disc-shaped shifting member is received about a cylindrical portion of said holding means and interposed between said driving portions of said driving member and corresponding abutment portions of said holding means,
means are provided for permitting said shifting member to be shifted in a predetermined direction substantially perpendicular to a central axis of said holding means by a component of force applied to said shifting member by said driving portions of said driving member, and
said shift permitting means includes an at least partial annular gap between respective arcuate portions of an inner periphery of said shifting member and an outer periphery of said cylindrical portion of said holding means, and diametrically opposed flat portions of said inner periphery of said shifting member engaged with corresponding flat portions on said outer periphery of said cylindrical portion of said holding means.

2. Clutch releasing bearing apparatus according to claim 1, wherein said holding means comprises an anvil made from plastic resin or metal, said abutment portions are disposed on said anvil, and said shift permitting means includes rolling members rollingly disposed between said anvil and said shifting member.

3. Clutch releasing bearing apparatus according to claim 2, wherein said abutment portions are diametrically opposed on said anvil.

4. Clutch releasing bearing apparatus according to claim 3, wherein said rolling members include first rollers disposed between said abutment portions and said shifting member, and second rollers disposed between said shifting member and portions of said anvil spaced about 90° from said abutment portions circumferentially of said anvil.

5. Clutch releasing bearing apparatus according to claim 1, wherein biasing means is disposed between said inner periphery of said shifting member and said outer periphery of said cylindrical portion of said holding means for restoring a predetermined positional relationship between said shifting member and said cylindrical portion of said holding means after shifting of said shifting member.

6. Clutch releasing bearing apparatus for vehicles, comprising a clutch releasing bearing including an engaging portion engaged by a diaphragm spring of a clutch device, and holding means holding said clutch releasing bearing and axially shiftably received on a guide shaft of a transmission device, said holding means being axially shiftable by driving portions of a pivotable driving member for urging said engaging portion of said clutch releasing bearing against said diaphragm spring, characterized in that:
said holding means includes a substantially cylindrical sleeve received about said guide shaft and having an integral radially outwardly extending flange portion, said flange portion having abutment portions against which a clutch releasing driving force is applied from said driving portions,
a hollow-disc shaped shifting member is received about said sleeve and disposed between said flange and said driving portions of said driving member, and
a gap is disposed between an inner periphery of said shifting member and an outer periphery of said sleeve, said gap being configured to permit said shifting member to be shifted radially of said sleeve by a correspondingly directed component of said driving force.

7. Clutch releasing bearing apparatus according to claim 6, wherein said holding means comprises an anvil made from plastic resin or metal, said abutment portions are disposed on anvil, and said rolling members are rollingly disposed between said anvil and said shifting member.

8. Clutch releasing bearing apparatus according to claim 7, wherein said abutment portions are diametrically opposed on said anvil.

9. Clutch releasing bearing apparatus according to claim 8, wherein said rolling members include first rollers disposed between said abutment portions and said shifting member, and second rollers disposed between said shifting member and portions of said anvil spaced about 90° from said abutment portions circumferentially of said anvil.

10. Clutch releasing bearing apparatus according to claim 6, wherein biasing means is disposed between said inner periphery of said shifting member and said outer periphery of said sleeve for restoring a predetermined positional relationship between said shifting member and said sleeve after shifting of said shifting member.

* * * * *